(12) United States Patent
Gong et al.

(10) Patent No.: US 10,922,177 B2
(45) Date of Patent: Feb. 16, 2021

(54) METHOD, DEVICE AND COMPUTER READABLE STORAGE MEDIA FOR REBUILDING REDUNDANT ARRAY OF INDEPENDENT DISKS

(71) Applicant: EMC IP Holding Company LLC, Hopkinton, MA (US)

(72) Inventors: Shaoqin Gong, Beijing (CN); Jian Gao, Beijing (CN); Xinlei Xu, Beijing (CN); Geng Han, Beijing (CN); Jibing Dong, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 57 days.

(21) Appl. No.: 15/955,082

(22) Filed: Apr. 17, 2018

(65) Prior Publication Data

US 2018/0300212 A1    Oct. 18, 2018

(30) Foreign Application Priority Data

Apr. 17, 2017    (CN) .......................... 2017 1 0250537

(51) Int. Cl.
*G06F 11/00* (2006.01)
*G06F 11/10* (2006.01)
*G06F 11/20* (2006.01)

(52) U.S. Cl.
CPC ...... *G06F 11/1092* (2013.01); *G06F 11/1076* (2013.01); *G06F 11/2094* (2013.01); *G06F 2201/82* (2013.01)

(58) Field of Classification Search
CPC ...... G06F 11/08; G06F 11/10; G06F 11/1004; G06F 11/1076–1096; G06F 11/2053; G06F 11/2064; G06F 11/2094
See application file for complete search history.

(56) References Cited

U.S. PATENT DOCUMENTS

| | | | |
|---|---|---|---|
| 7,711,897 B1 * | 5/2010 | Chatterjee | G06F 3/0605 711/112 |
| 9,286,007 B1 | 3/2016 | Bono | |
| 9,639,296 B1 * | 5/2017 | Vincent | G06F 3/0665 |
| 9,804,939 B1 | 10/2017 | Bono et al. | |
| 9,990,263 B1 * | 6/2018 | Tian | G06F 11/1092 |
| 10,365,983 B1 | 7/2019 | Foley et al. | |
| 10,496,482 B1 | 12/2019 | Foley et al. | |
| 10,585,855 B1 | 3/2020 | Armangau et al. | |
| 2009/0271659 A1 * | 10/2009 | Troppens | G06F 11/1092 714/6.32 |

(Continued)

FOREIGN PATENT DOCUMENTS

CN    101576833    11/2009

*Primary Examiner* — Michael Maskulinski
(74) *Attorney, Agent, or Firm* — BainwoodHuang (57) ABSTRACT

Embodiments of the present disclosure relate to method, device and computer readable storage media for rebuilding redundant array of independent disks (RAID). The method comprises: in response to detecting at least one fault disk in the RAID, adding a new disk to the RAID for rebuilding; determining, according to a mapping table, a first set of storage blocks marked as "free" in the at least one fault disk, the mapping table indicating usage state of storage space in the RAID; and writing a predetermined value into a second set of storage blocks corresponding to the first group of storage blocks in the new disk.

13 Claims, 9 Drawing Sheets

(56) References Cited

U.S. PATENT DOCUMENTS

| | | | |
|---|---|---|---|
| 2012/0226853 A1* | 9/2012 | Bert | G06F 3/0619 |
| | | | 711/114 |
| 2014/0208046 A1 | 7/2014 | Baryudin et al. | |
| 2016/0217040 A1* | 7/2016 | Jin | G06F 11/1088 |
| 2017/0192865 A1* | 7/2017 | Pan | G06F 12/023 |
| 2017/0364289 A1* | 12/2017 | Liu | G06F 3/0619 |

* cited by examiner

METHOD, DEVICE AND COMPUTER READABLE STORAGE MEDIA FOR REBUILDING REDUNDANT ARRAY OF INDEPENDENT DISKS

RELATED APPLICATIONS

This application claim priority from Chinese Patent Application Number CN201710250537.7, filed on Apr. 17, 2017 at the State Intellectual Property Office, China, titled "METHOD, DEVICE AND COMPUTER READABLE STORAGE MEDIA FOR REBUILDING OF REDUNDANT ARRAY OF INDEPENDENT DISKS (RAID)" the contents of which is herein incorporated by reference in its entirety.

FIELD

Embodiments of the present disclosure generally relate to the field of data storage, and more specifically, to method, device and computer readable storage media for rebuilding redundant array of independent disks (RAID).

BACKGROUND

With the development of data storage technology, various data storage devices have been able to provide increasingly higher data storage capability for users, and data access speed is also increased to a great extent. While increasing data storage capacity, users also put forward a higher requirement on data reliability and response time of the storage system.

At present, various redundant array of independent disks (RAID)-based data storage systems have been developed to enhance the data reliability. When one or more disks in the RAID fail, the data in the fault disk can be recovered from data on the other fault-free disks. As the current rebuilding procedure usually takes a longer time and RAID lacks redundancy ability during the procedure, so risks of data loss may occur. Therefore, how to rapidly complete the rebuilding of the RAID becomes a hot area of research.

SUMMARY

Embodiments of the present disclosure provide method, device and computer readable storage media for rebuilding redundant array of independent disks (RAID).

In a first aspect of the present disclosure, there is provided a method for rebuilding a redundant array of independent disks (RAID). The method comprises: in response to detecting at least one fault disk in the RAID, adding a new disk to the RAID for rebuilding; determining, according to a mapping table, a first set of storage blocks marked as "free" in the at least one fault disk, the mapping table indicating usage state of storage space in the RAID; and writing a predetermined value into a second set of storage blocks corresponding to the first group of storage blocks in the new disk.

In a second aspect of the present disclosure, there is provided a device for rebuilding a redundant array of independent disks (RAID). The device comprises: at least one processing unit; at least one memory coupled to the at least one processing unit and storing instructions executed by the at least one processing unit, the instructions, when executed by the at least one processing unit, causing the device to perform actions. The actions comprising: in response to detecting at least one fault disk in the RAID, adding a new disk to the RAID for rebuilding; determining, according to a mapping table, a first set of storage blocks marked as "free" in the at least one fault disk, the mapping table indicating usage state of storage space in the RAID; and writing a predetermined value into a second set of storage blocks corresponding to the first group of storage blocks in the new disk.

In a third aspect of the present disclosure, there is provided a computer-readable storage medium having computer-readable program instructions stored thereon, the computer-readable program instructions, when executed by a processing unit, causing the processing unit to implement the method according to the first aspect of the present disclosure.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent. The same reference sign usually refers to the same component in the example embodiments of the present disclosure.

In each drawing, same or corresponding signs refer to same or corresponding parts.

DETAILED DESCRIPTION OF EMBODIMENTS

Preferred embodiments of the present disclosure will be described in more details with reference to the drawings. Although the drawings illustrate the preferred embodiments of the present disclosure, it should be appreciated that the present disclosure may be implemented in various manners and should not be limited to the embodiments illustrated herein. Instead the embodiments are provided to make the present disclosure clearer and more complete, and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example embodiment" and "one embodiment" are to be read as "at least one example embodiment." The term "a further embodiment" is to be read as "at least a further embodiment." The terms "first", "second" and the like may refer to same or different objects. Other definitions, explicit and implicit, may be included below.

Figure 1A:
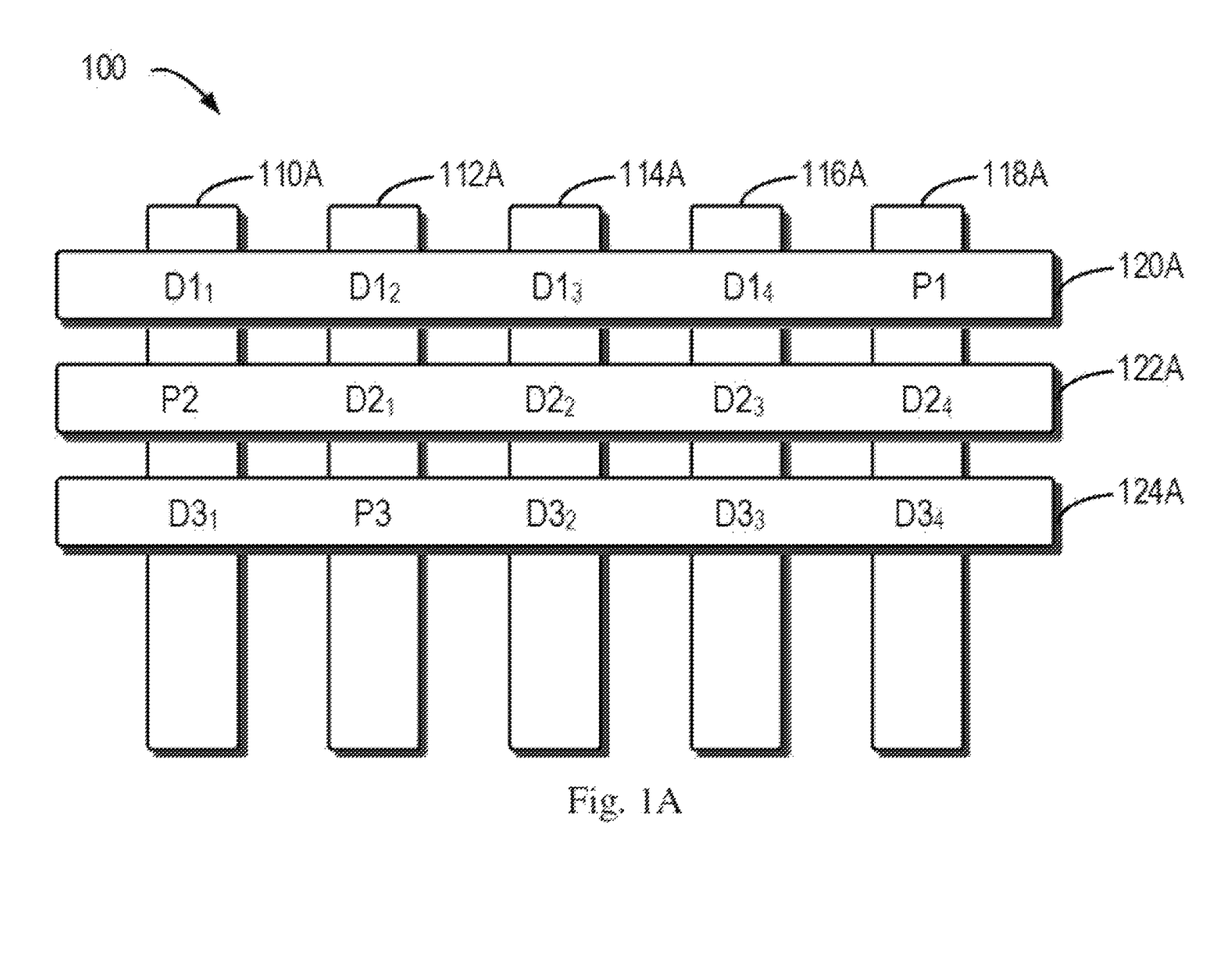
FIG. 1A illustrates a schematic diagram of an example structure of a redundant array of independent disks (RAID)

As described above, the traditional rebuilding procedure usually takes a longer time and RAID lacks redundancy ability during the procedure, risks of data loss may therefore occur. FIG. 1A illustrates an example structure of a redundant array of independent disks (RAID) 100. RAID 100 is demonstrated as an RAID-5 (4+1) array comprising five independent storage devices (110A, 112A, 114A, 116A and 118A). It should be noted that although FIG. 1A schematically illustrates five storage devices, more or less storage devices may be included according to different versions of RAID in other implementations. Despite FIG. 1A illustrates strip 120A, 122A and 124A, RAID 100 may also comprise different number of strips in other implementations.

In RAID 100, a strip crosses a plurality of physical storage devices (e.g., strip 120A crosses storage devices 110A, 112A, 114A, 116A and 118A). The strip may be simply construed as a storage area among the plurality of storage devices which satisfies a given address range. Data stored in the strip 120A comprises a plurality of parts: a data block $D1_1$ stored on the storage device 110A, a data block $D1_2$ stored on the storage device 112A, a data block $D1_3$ stored on the storage device 114A, a data block $D1_4$ stored on the storage device 116A, and a data block P1 stored on the storage device 118A. In the example, data blocks $D1_1$, $D1_2$, $D1_3$ and $D1_4$ are stored data, and the data block P1 is the parity of the stored data.

Other strips (e.g., strip 122A) store data in a way similar to the strip 120A and the difference lies in that the related parity may be stored on other storage devices (such as storage device 110A) than the storage device 118A. In this way, when one of the plurality of storage devices, 110A, 112A, 114A, 116A and 118A fails, data in the fault device may be recovered from other fault-free storage devices.

Figure 1B:
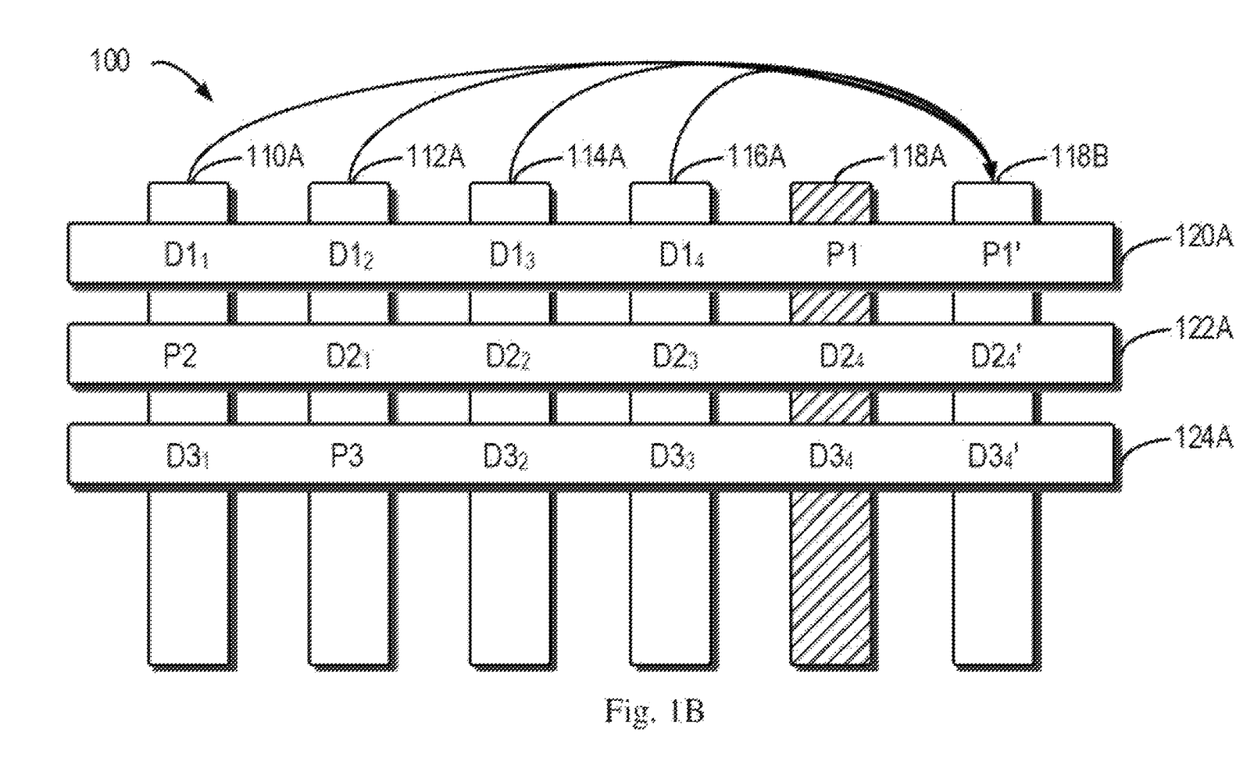
FIG. 1B illustrates a schematic diagram of a traditional rebuilding procedure of RAID.

FIG. 1B illustrates a traditional rebuilding procedure of RAID 100. As shown in FIG. 1B, when one storage device (e.g., storage device 118A indicated by shade) fails, data may be recovered from the rest fault-free storage devices 110A, 112A, 114A and 116A. At this moment, a new backup storage device 118B may be added into RAID for replacing the storage device 118A. In this way, recovered data may be written into 118B for implementing the rebuilding of the storage system.

The storage system may still receive data access (e.g., read/write) requests from the users during the rebuilding procedure. However, when the access request needs to execute data access (e.g., write) to the fault storage device, the conventional data access operations will be replaced by a series of complicated operations as the storage system is being rebuilt. Specifically, if the storage device receives a write request for the fault storage device, the following operations need to be executed in the storage system: (1) writing data into log; (2) writing data into a RAID address space; (3) comparing data written in steps (1) and (2) to verify that the data in the RAID address space is correct; and (4) nullifying data in the log. The above steps (1), (3) and (4) are additional steps for conventional writing process.

Traditionally, the above additional steps need to be executed within the storage system during the rebuilding procedure of the storage system. However, the additional steps will significantly interfere the rebuilding of the storage system. Moreover, the additional steps will impose extra burden on the rebuilding of the storage system and increase the time of the rebuilding procedure.

Additionally, security of the storage system is poor during the rebuilding procedure. In a case of RAID 100 of RAID5 as shown in FIGS. 1A and 1B, there are only four storage devices that operate normally during the rebuilding procedure. Once one of the four storage devices fails, unrecoverable data loss of the storage system may occur. The risks faced by the storage system will get huger during the rebuild procedure as the rebuilding time increases.

To at least partially solve the above problems and one or more of other potential problems, embodiments of the present disclosure propose a solution for rebuilding a redundant array of independent disks (RAID). The solution establishes in the RAID controller a mapping table, which indicates the usage state of storage space of disks in the RAID, such that only the used storage blocks in the fault disk are to be rebuilt during the rebuilding procedure. Therefore, the solution can implement fast and efficient RAID rebuilding with lower risks of data loss.

Figure 2:
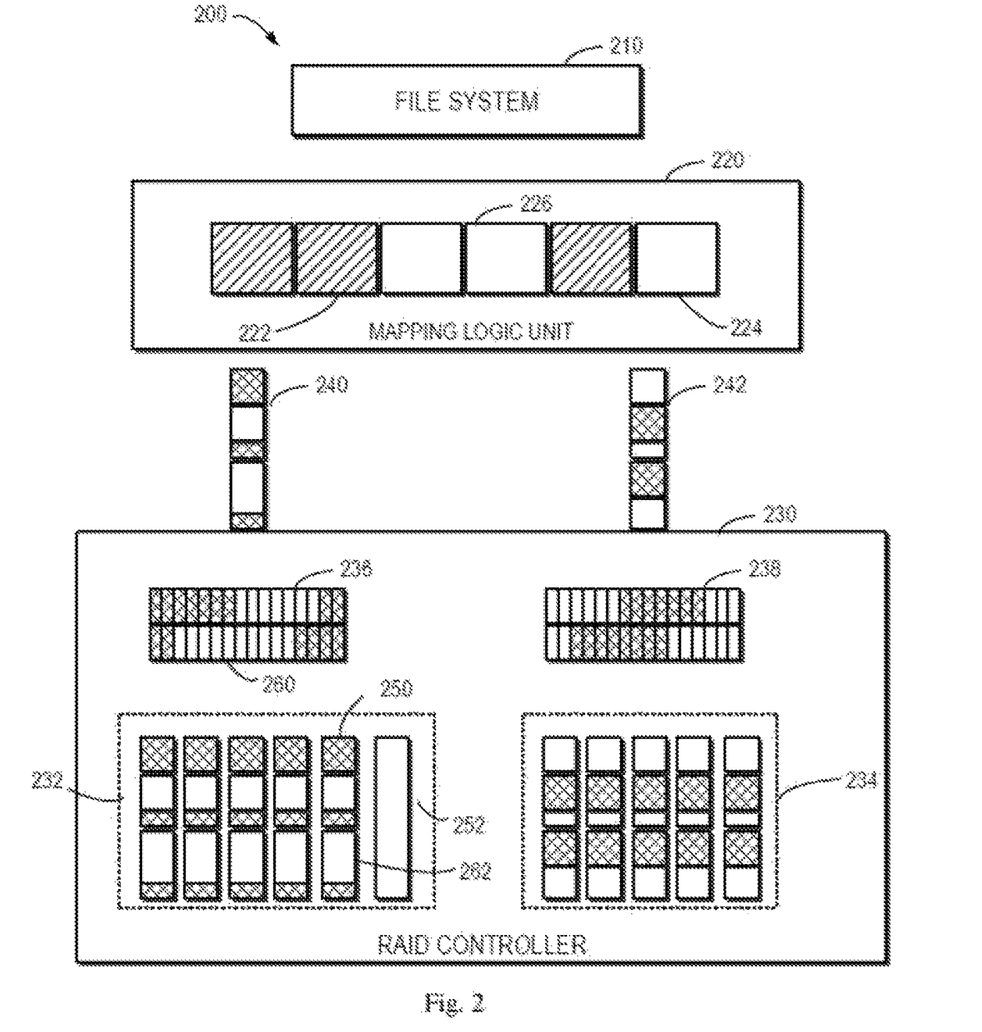
FIG. 2 illustrates architecture graph of a storage system in which embodiments of the present disclosure can be implemented.

FIG. 2 illustrates architecture of a storage system 200 in which embodiments of the present disclosure may be implemented. As shown in FIG. 2, the storage system 200 comprises a file system 210, a mapping logic unit 220 and a RAID controller 230.

The RAID controller 230 may combine a plurality of physical storage devices into one or more RAIDs according to different standards of RAID. For example, as shown in FIG. 2, the RAID controller 230 may comprise two RAID5-type RAIDs 232 and 234. The RAID controller 230 will provide each combined RAID to the mapping logic unit 220 in the form of logic units (LU). For example, RAID 232 and RAID 234 are provided for the mapping logic unit 220 in the form of LU 240 and LU 242 respectively, as shown in FIG. 2.

In the mapping logic unit 220, the space corresponding to one or more LUs provided by the RAID controller 230, may be segmented into some logic storage slices with a fixed size. For example, the mapping logic unit 220 may segment the LU 240 and the LU 242 into several logic storage slices with a 256 MB size, thereby forming a logic storage slice pool.

In some embodiments, the mapping logic unit 220 may comprise a sparse volume 226, for dynamically applying for the logic storage slices from the logic storage slice pool and/or releasing the used logic storage slices into the logic storage slice pool. The mapping logic unit 220 may, in response to an IO request issued to the mapping logic unit 220 by the file system 210, dynamically acquire from the logic storage slice pool a logic storage slice for the file system 210. For example, the logic storage slice 222 indicated by slash in the sparse volume 226 of FIG. 2 indicates that the logic storage slice is used by the file system 210. The blank position 224 in the sparse volume 226 of FIG. 2 indicates that the logic storage space is not used by the file system 210, also known as void. The mapping logic unit 220 may also, in response to a request for releasing space from the file system 210, release the logic storage slices used by the file system in the sparse volume 226 into the logic storage slice pool. The detailed procedure will be described in the following.

Based on the storage mechanism described above, the physical storage space of the storage system 200 may be dynamically added into the file system 210, and may also be dynamically released from the file system 210. Meanwhile, the logic storage slice 222 in the sparse volume may be mapped via the mapping logic unit 220 to one or more LUs, such as LU 240 or LU 242. Meanwhile, the usage state of the storage space in LU 240 and LU 242 is consistent with the usage state of the physical storage space in all disks of the corresponded RAID 232 and RAID 234. Therefore, this mechanism provides the chance for acquiring usage state of physical storage space in each disk of RAID.

The RAID controller 230 may also comprise mapping tables corresponding to one or more RAIDs. For example, the RAID controller 230 may comprise a mapping table 236 corresponding to the RAID 232, and a mapping table 238 corresponding to the RAID 234 as shown in FIG. 2. The mapping tables 236 and 238 store the usage state corresponding to physical storage space of a logic storage slice size in the sparse volume 226. In some embodiments, the mapping table 236 and/or 238 may indicate the usage state of the storage block with a bit, e.g., 1 may indicate that the storage block in use, and 0 may indicate that the storage block is free.

According to embodiments of the present disclosure, when a disk fails, the RAID controller 230 may determine, based on the mapping tables 236 and 238, a set of storage blocks (referred to as "first set of storage blocks" herein), which are free in the fault disk. Afterwards, the RAID controller 230 may write a predetermined value into another set of storage blocks (referred to as "second set of storage blocks" herein) in a new disk while rebuilding the new disk, wherein the second set of storage blocks are corresponded with the first group of storage blocks. In this way, only the used storage blocks in the fault disk are to be rebuilt during the rebuilding procedure, which enhances efficiency and security of rebuilding. Operations related to rebuilding RAID according to embodiments of the present disclosure will be described in details below with reference to FIGS. 3 to 6.

Figure 3:
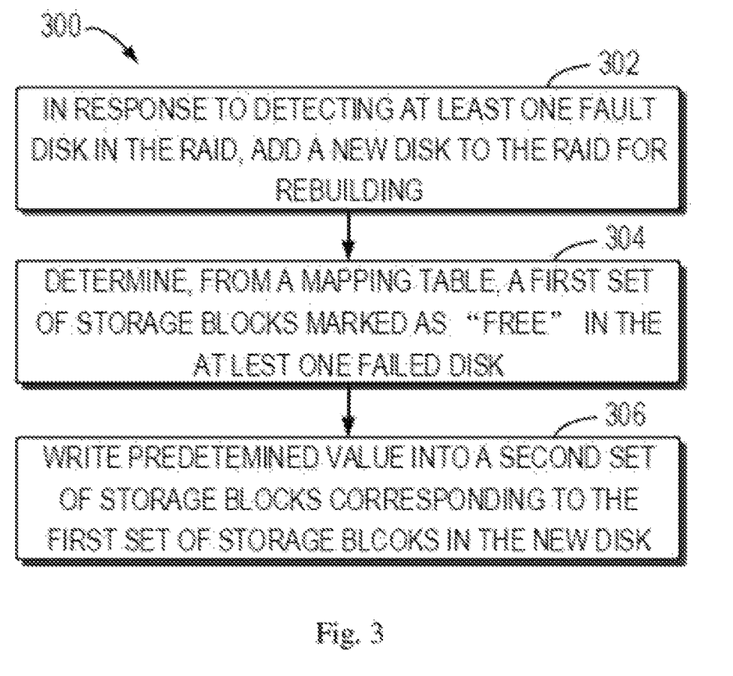
FIG. 3 illustrates a flowchart of a method for rebuilding of RAID according to some embodiments of the present disclosure.

FIG. 3 illustrates a flowchart of a method 300 for rebuilding RAID according to some embodiments of the present disclosure. The method 300 may be implemented in the storage system 200 shown in FIG. 2.

In block 302, the RAID controller 230, in response to detecting at least one fault disk 250 in the RAID 232, adds a new disk 252 to the RAID for rebuilding. In some embodiments, the new disk 252 may be a hot-spare disk.

In block 304, the RAID controller 320 determines, according to a mapping table, a first set of storage blocks marked as "free" in the at least one fault disk 118B, wherein the mapping table indicates usage state of storage space in the RAID. For example, as shown in FIG. 2, the RAID controller 230 may determine the first set of storage blocks marked as "free", i.e., unused storage block 262 in the fault disk 250 corresponding to the area 260 marked as "blank" in the mapping table 236, through checking the mapping table 236 corresponding to the RAID 232 as shown in FIG. 2.

Figure 4:
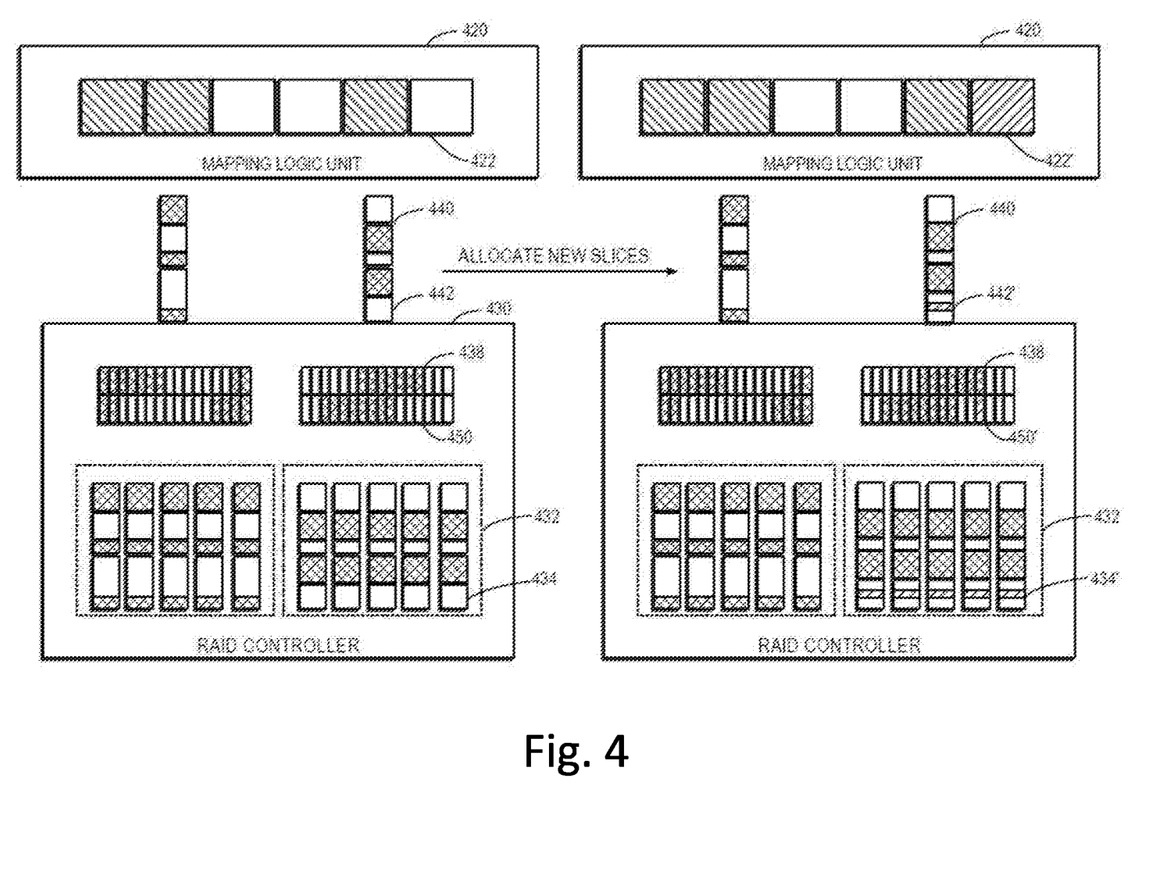
FIG. 4 illustrates a schematic diagram of a procedure for updating the mapping table according to some embodiments of the present disclosure.
Figure 5:
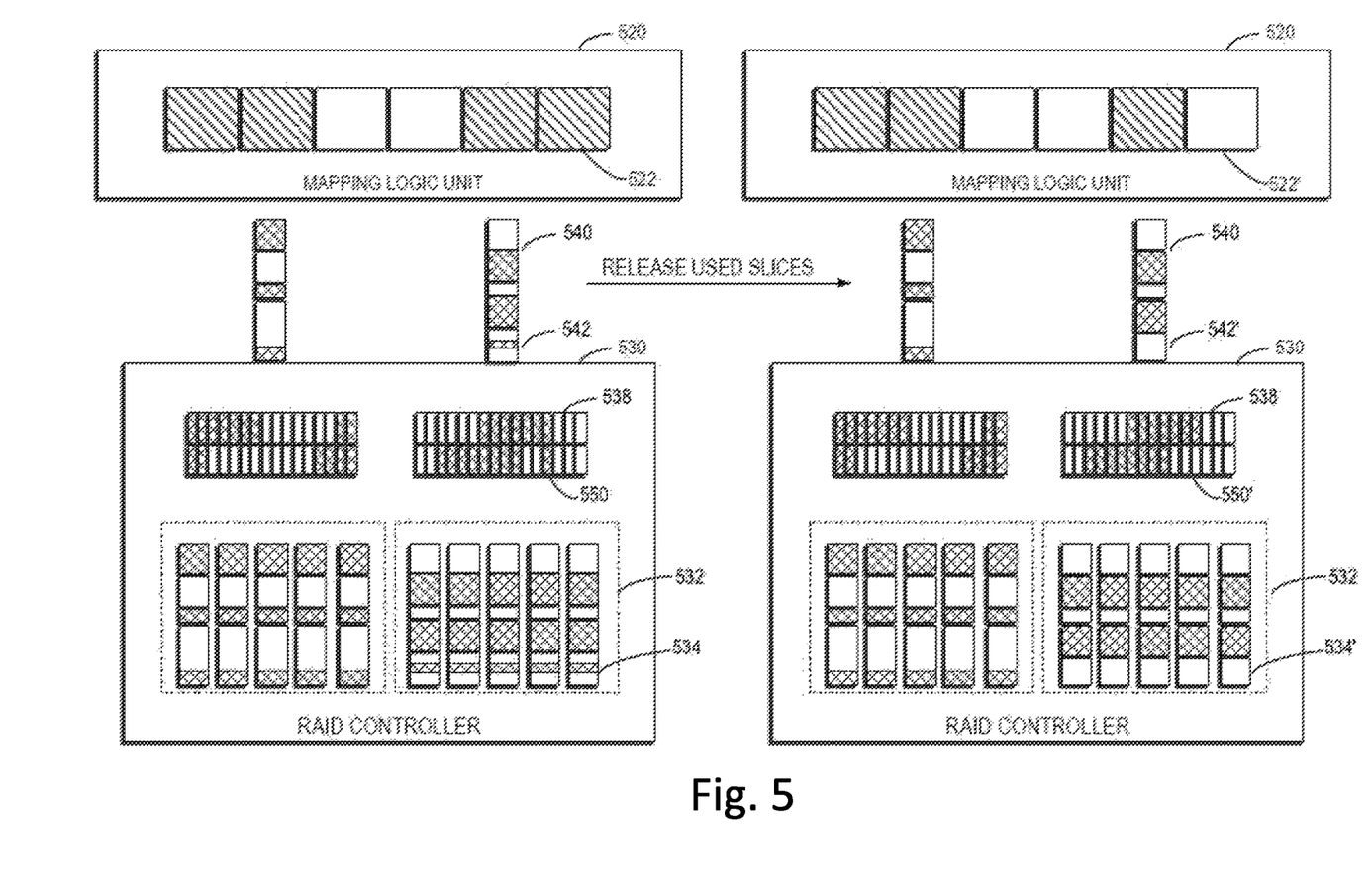
FIG. 5 illustrates a schematic diagram of a procedure of updating the mapping table according to some further embodiments of the present disclosure.

The following text will describe how to determine usage state of physical storage space stored in the mapping table with reference to FIGS. 4 and 5. FIG. 4 illustrates a schematic diagram of a procedure 400 for updating mapping tables according to some embodiments of the present disclosure.

In some embodiments, the file system (e.g., file system 210 shown in FIG. 2) may apply for allocating a new logic storage slice from the mapping logic unit 420. For example, based on a write request sent to the mapping logic unit 420 from the file system, the mapping logic unit 420 determines a new logic storage slice needs to be applied for to respond the write request of the file system.

The mapping logic unit 420 may allocate a new logic storage slice from the logic storage slice pool for use of the file system, and then send the RAID controller 430 an indication (referred to as "first indication" herein) of a logic storage slice to be used in the mapping logic unit 420. For example, the indication may indicate that the space 442' of the LU 440 provided by the RAID controller 430 will be used by the mapping logic unit 420.

The RAID controller 430 marks, in response to the first indication, a storage block 434' corresponding to the space 442' to be used of the LU 440 as "used" in the mapping table 438. As shown in FIG. 4, the physical storage block 434' corresponding to the space 442' to be used of the LU 440 is marked as "used" (indicated by slash in FIG. 4) in the mapping table 438. As shown in FIG. 4, space 442 of the LU 440 is updated to be 442', the position 450 in the mapping table 438 is updated to be 450' and the physical storage block 434 in the RAID 432 is updated to be 434'. In some embodiments, the usage state of the physical storage block may be indicated by a bit, wherein 1 may indicate that the storage block is used, and 0 may indicates that the storage block is free.

Having marked the physical storage block 434', the RAID controller 430 issues to the mapping logic unit 420 an indication (referred to as "second indication" herein), that the storage block (e.g., physical storage block 434') corresponding to the logic storage slice to be used has already been marked as "available" in the mapping table. In response to the second indication, the mapping logic unit 420 marks the allocated new logic storage slice 422' as "available" for use of the file system 210, i.e., the void 422 is updated to be a used logic storage slice 422' according to FIG. 4.

FIG. 5 illustrates a schematic diagram of a procedure 500 for updating the mapping table according to some further embodiments of the present disclosure. In some embodiments, the file system may issue a request for releasing space to the mapping logic unit 520. In response to the request, the mapping logic unit 520 issues to the RAID controller 530 an indication (referred to as "third indication" herein) of a logic storage slice to be released in the mapping logic unit 520. For example, the indication may indicate that space 542 of the LU 540 will no longer be used by the mapping logic unit 520.

In response to the third indication, the RAID controller 530 marks the storage block 534' corresponding to the space 542' to be used of the LU 540 as "free" in the mapping table 538. As shown in FIG. 5, space 542 in the LU 540 is updated to be 542', the position 550 in the mapping table 538 is updated to be 550' and the physical storage block 534 in the RAID 532 is updated to be 534'. In some embodiments, the usage state of the physical storage block may be represented by a bit, wherein 1 may indicate that the storage block is used, and 0 may indicate that the storage block is free.

Having marked the physical storage block 534', the RAID controller 530 issues to the mapping logic unit 220 an indication (referred to as "fourth indication" herein) that the storage block (e.g., physical storage bloc 534') corresponding to the logic storage slice to be released has already been marked as "released" in the mapping table (e.g., mapping table 538). In response to the fourth indication, the mapping logic unit 220 marks the logic storage slice 522 as "released", i.e., the logic storage slice 522 is updated to be void 522'.

Based on the above description, the mapping logic unit 220 may acquire one or more RAIDs managed by itself in real time, such as usage state of storage blocks in disks of the RAID 232 and/or RAID 234, and mark usage state of the storage blocks in respective disk of the corresponding one or more mapping tables, e.g., mapping table 236 and/or mapping table 238. In other words, RAID 232 may, based on the usage state of the fault disk 250 stored in the mapping table 236, determine a first set of storage blocks 262 marked as "free" in the fault disk 250.

Referring back to FIG. 3, in block 306, the RAID controller 230 may write a predetermined value into a second set of storage blocks corresponding to the first storage block 262 in the new disk 252, wherein the predetermined value may be any appropriate value. In some embodiments, the predetermined value can be set as zero. Correspondingly, the RAID controller 230 may write zero into the second set of storage blocks.

From the method described above, the RAID 232 does not need to rebuild all storage blocks in the fault disk 250 during the rebuilding procedure. Instead, it pre-determines the unused storage block 262 in the fault disk 250 through the mapping table mechanism, and writes zero into the storage block corresponding to the unused storage block in the new disk 252, thereby reducing time required by the rebuilding of the RAID 232 and lowering the risks of data loss during the rebuilding procedure of the RAID 232.

Figure 6:
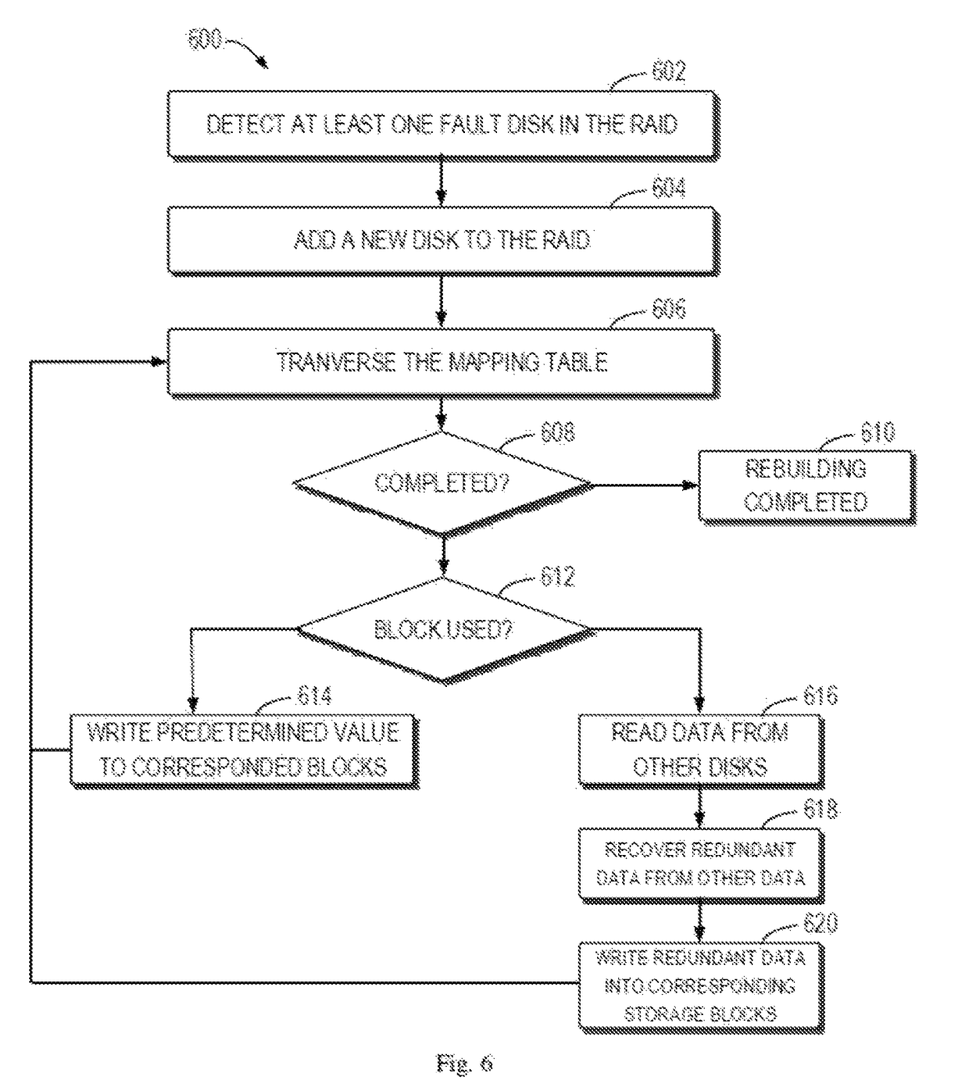
FIG. 6 illustrates a flowchart of a method for rebuilding RAID according to some further embodiments of the present disclosure.

FIG. 6 illustrates a flowchart of a method 600 for rebuilding RAID according to some further embodiments of the present disclosure. The method 600 may be executed in the storage system 200 shown in FIG. 2. It should be understood that the method 600 may also comprise additional actions not shown and/or omit the shown actions. The scope of the present disclosure will not be restricted in this regard.

In block 602, the RAID controller 230 detects at least one fault disk 250 in the RAID 232. In block 604, the RAID controller 230 adds a new disk 252 to the RAID 232 for rebuilding. In block 606, the RAID 230 traverses the mapping table 236 corresponding to the RAID 232, wherein the mapping table stores usage state of magnetic disk blocks in the fault disk 250. It determines whether the traverse of the mapping table 236 is completed in block 608; if yes, the rebuilding of RAID 232 is completed and the method 600 proceeds to block 610; otherwise, the method 600 proceeds to block 612.

In block 612, the RAID controller 230 determines, based on usage state of the storage blocks stored in the mapping table 236, whether the existing storage block in need of rebuilding is used or not. In some embodiments, it may represent usage state of the storage block by a bit, wherein 1 may indicate that the storage block is used, and 0 may indicate that the storage block is free.

If the existing storage block in need of rebuilding is not used, the method 600 proceeds to block 614. In block 614, a predetermined value is written into the corresponding storage block of the new disk 252. In some embodiments, it may write zero into the corresponding storage blocks of the new disk 252. When writing of the storage block is completed, the method 600 returns to block 606 and the traverse of the mapping table 236 continues.

If the existing storage block in need of rebuilding has been used, the method 600 proceeds to block 616. In block 616, the RAID controller 230 acquires data from other disks in the RAID 232. In some embodiments, it may acquire data blocks and/or parity from the fault-free disks of the RAID 232. In block 618, the RAID controller 230 recovers redundant data with data acquired from the fault-free disks. In block 620, the RAID controller 230 writes the recovered redundant data into the corresponding storage blocks of the new disk 252. When the writing of the storage block is completed, the method 600 returns to block 606 and the traverse of the mapping table 230 continues.

Through the above rebuilding method, RAID may employ different rebuilding strategies for storage blocks in different usage states of the fault disk, executing particular operations, such as writing zero, on the free magnetic disk blocks, so as to reduce time required by the rebuilding of the RAID and lower the risks of data loss.

Figure 7:
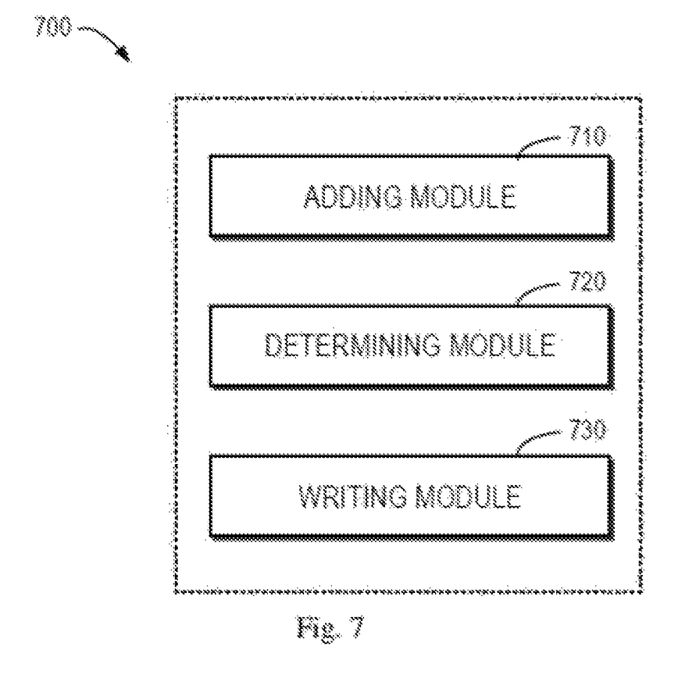
FIG. 7 illustrates a block diagram of an apparatus for rebuilding RAID according to some embodiments of the present disclosure.

FIG. 7 illustrates a block diagram of an apparatus 700 for rebuilding RAID according to embodiments of the present disclosure. For example, any of the RAID controller 230 shown by FIG. 2, the RAID controller 330 shown by FIG. 3 and the RAID controller 430 shown by FIG. 4 may be implemented by the apparatus 700. According to FIG. 7, the apparatus 700 may comprise an adding module 710 configured to add a new disk to the RAID for executing rebuilding in response to detecting at least one fault disk in the RAID. The apparatus 700 may also comprise a determining module 720 configured to determine, according to a mapping table, a first set of storage blocks marked as "free" in the at least one fault disk. Besides, the apparatus 700 may also comprise a writing module 730 for writing a predetermined value into a second set of storage blocks corresponding to the first group of storage blocks in the new disk.

For the purpose of being clear, FIG. 7 does not illustrate some optional modules of the apparatus 700. However, it should be understood that various features described above by FIGS. 1-6 are also applicable to the apparatus 700. Besides, the various modules of the apparatus 700 may be hardware modules as well as software modules. For example, in some embodiments, the apparatus 700 may be implemented partially or fully using the software and/or firmware, such as being implemented as computer program product included on the computer-readable medium. Alternatively or additionally, the apparatus 700 may be implemented fully or partially based on the hardware, such as being implemented as integrated circuit (IC), application-specific integrated circuit (ASIC), system-on-chip (SOC), field programmable gate array (FPGA) and the like. The scope of the present disclosure is not limited in this regard.

Figure 8:
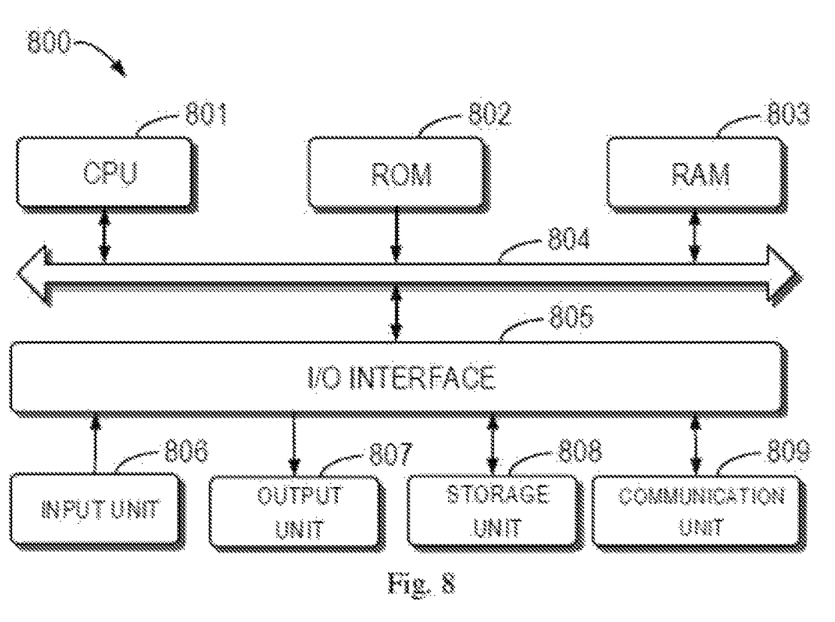
FIG. 8 illustrates a schematic block diagram of a device for implementing embodiments of the present disclosure.

FIG. 8 illustrates a schematic block diagram of a device 800 for implementing embodiments of the present disclosure. For example, any of the RAID system 230 shown by FIG. 2, the RAID controller 330 shown by FIG. 3 and the RAID controller 430 shown by FIG. 4 may be implemented by the device 800. As shown in FIG. 8, the device 800 comprises a central process unit (CPU) 801, which may execute various appropriate actions and processing based on the computer program instructions stored in the read-only memory (ROM) 802 or computer program instructions loaded in the random-access memory (RAM) 803. The RAM 803 can also store various programs and data needed for the operation of the device 800. CPU 801, ROM 802 and RAM 803 are connected to each other via a bus 804. The input/output (I/O) interface 805 is also connected to the bus 804.

A plurality of components in the device 800 are connected to the I/O interface 805, including: an input unit 806, such as a keyboard, a mouse and the like; an output unit 807, e.g., various types of display, loudspeakers, and the like; a storage unit 808, such as a magnetic disk, an optical disk, and the like; and a communication unit 809, such as a network card, a modem, a wireless transceiver and the like. The communication unit 809 allows the device 800 to exchange information/data with other devices through the computer network, such as Internet, and/or various types of telecommunication networks.

Various processes and processing described above, such as method 300, may be executed by the processing unit 801. For example, in some embodiments, the method 300 may be implemented as a computer software program tangibly embodied on the machine-readable medium, e.g., storage unit 808. In some embodiments, the computer program can be partially or fully loaded and/or mounted to the device 800 via ROM 802 and/or communication unit 809. When the computer program is loaded to RAM 803 and executed by the CPU 801, one or more steps of the method 300 described above may be implemented.

The present disclosure may be a method, an apparatus, a system and/or a computer program product. The computer program product may include a computer readable storage medium (or media) having computer readable program instructions thereon for causing a processor to perform aspects of the present disclosure.

The computer readable storage medium may be a tangible device that may retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. Non-exhaustive and more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other electromagnetic waves propagating freely, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to implement aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processing unit of the computer or other programmable data processing apparatus, create means for implementing the functions/actions specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or actions, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of rebuilding a redundant array of independent disks (RAID), the method comprising:
    in response to detecting at least one fault disk in the RAID, adding a new disk to the RAID for rebuilding;
    determining, from a mapping table, a first set of storage blocks marked as "free" in the at least one fault disk, the mapping table indicating usage state of storage space in the RAID; and
    writing a predetermined value into a second set of storage blocks corresponding to the first set of storage blocks in the new disk,
    wherein the mapping table indicates usage state of storage blocks in the RAID, the storage blocks corresponding to logic storage slices in a mapping logic unit, and wherein the method further comprises:
        in response to the mapping logic unit receiving a write request, (i) allocating a new slice from a slice pool and (ii) sending a first indication to a RAID controller that controls the RAID, the first indication identifying the new slice;
        in response to the RAID controller receiving the first indication, marking as used in the mapping table a block that corresponds to the new slice;
        sending, by the RAID controller to the mapping logic unit, a second indication that the new slice is available; and
        in response to the mapping logic unit receiving the second indication, marking the new slice as available in the mapping logic unit.

2. The method of claim 1, further comprising:
    reading, from fault-free disks in the RAID, data associated with a third set of storage blocks in the fault disk, which are marked as "used" in the mapping table;
    determining, based on the read data, redundant data corresponding to the third set of storage blocks; and
    writing the redundant data into a fourth set of storage blocks corresponding to the third set of storage blocks in the new disk.

3. The method of claim 1, further comprising updating the mapping table, the updating comprising:
    in response to receiving from the mapping logic unit a third indication of a logic storage slice to be released in the mapping logic unit, marking the storage block corresponding to the logic storage slice to be released as "free" in the mapping table.

4. The method of claim 3, the updating further comprising:
    sending to the mapping logic unit a fourth indication indicating that the storage block corresponding to the logic storage slice to be released has been marked as "released" in the mapping table.

5. The method of claim 1, wherein disks in the RAID are hard disk drives.

6. The method of claim 1, further comprising:
    receiving, by the RAID controller of the RAID from the mapping logic unit, a third indication that identifies a particular slice to be released from the mapping logic unit;
    in response to the RAID controller receiving the third indication, marking as free in the mapping table a block that corresponds to the particular slice;
    sending, by the RAID controller to the mapping logic unit, a fourth indication that the block that corresponds to the particular slice has been released; and
    in response to the mapping logic unit receiving the fourth indication, marking the particular slice as released in the mapping logic unit.

7. A storage system comprising:
    at least one processing unit;
    at least one memory coupled to the at least one processing unit and storing instructions executed by the at least one processing unit, the instructions, when executed by the at least one processing unit, causing the storage system to perform actions, the actions comprising:
        in response to detecting at least one fault disk in a redundant array of independent disks (RAID), a RAID controller adding a new disk to the RAID for rebuilding;
        the RAID controller determining, from a mapping table, a first set of storage blocks marked as "free" in the at least one fault disk, the mapping table indicating usage state of storage space in the RAID; and
        the RAID controller writing a predetermined value into a second set of storage blocks corresponding to the first set of storage blocks in the new disk,
        wherein the mapping table indicates usage state of storage blocks in the RAID, the storage blocks corresponding to logic storage slices in a mapping logic unit, and wherein the actions further comprise:
            in response to the mapping logic unit receiving a write request, (i) allocating a new slice from a slice pool and (ii) sending a first indication to the RAID controller that controls the RAID, the first indication identifying the new slice, the RAID controller and the mapping logic unit running in the storage system;
            in response to the RAID controller receiving the first indication, marking as used in the mapping table a block that corresponds to the new slice;
            sending, by the RAID controller to the mapping logic unit, a second indication that the new slice is available; and
            in response to the mapping logic unit receiving the second indication, marking the new slice as available in the mapping logic unit.

8. The storage system of claim 7, the actions further comprising:

reading, from fault-free disks in the RAID, data associated with a third set of storage blocks in the fault disk, which are marked as "used" in the mapping table;

determining, based on the read data, redundant data corresponding to the third set of storage blocks; and writing the redundant data into a fourth set of storage blocks corresponding to the third set of storage blocks in the new disk.

9. The storage system of claim 7, the actions further comprising updating the mapping table, and the updating comprising:

in response to receiving from the mapping logic unit a third indication indicating a logic storage slice to be released in the mapping logic unit, marking the storage block corresponding to the logic storage slice to be released as "free" in the mapping table.

10. The storage system of claim 9, wherein the updating further comprises:

sending to the mapping logic unit a fourth indication indicating that the storage block corresponding to the logic storage slice to be released has been marked as "released" in the mapping table.

11. The storage system of claim 7, wherein disks in the RAID are hard disk drives.

12. A computer program product for rebuilding a redundant array of independent disks (RAID), the computer program product comprising:

a non-transitory computer readable medium encoded with computer executable code, the code configured to enable the execution of:

in response to detecting at least one fault disk in the RAID, adding a new disk to the RAID for rebuilding;

determining, from a mapping table, a first set of storage blocks marked as "free" in the at least one fault disk, the mapping table indicating usage state of storage space in the RAID; and writing a predetermined value into a second set of storage blocks corresponding to the first set of storage blocks in the new disk, wherein the mapping table indicates usage state of storage blocks in the RAID, the storage blocks corresponding to logic storage slices in a mapping logic unit, and wherein the code is further configured to enable the execution of:

receiving, by a RAID controller of the RAID from the mapping logic unit, a third indication that identifies a particular slice to be released from the mapping logic unit;

in response to the RAID controller receiving the third indication, marking as free in the mapping table a block that corresponds to the particular slice;

sending, by the RAID controller to the mapping logic unit, a fourth indication that the block that corresponds to the particular slice has been released; and in response to the mapping logic unit receiving the fourth indication, marking the particular slice as released in the mapping logic unit.

13. The computer program product of claim 12, wherein the code is further configured to enable the execution of:

in response to the mapping logic unit receiving a write request, (i) allocating a new slice from a slice pool and (ii) sending a first indication to the RAID controller, the first indication identifying the new slice;

in response to the RAID controller receiving the first indication, marking as used in the mapping table a block that corresponds to the new slice;

sending, by the RAID controller to the mapping logic unit, a second indication that the new slice is available; and in response to the mapping logic unit receiving the second indication, marking the new slice as available in the mapping logic unit.

* * * * *